United States Patent
Schmitt et al.

(10) Patent No.: US 6,321,154 B1
(45) Date of Patent: Nov. 20, 2001

(54) METHOD AND APPARATUS FOR CONTROLLING DRIVE SLIP

(75) Inventors: Johannes Schmitt; Andreas Zoebele, both of Markgroeningen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/376,903

(22) Filed: Aug. 18, 1999

(30) Foreign Application Priority Data

Aug. 19, 1998 (DE) ................................................ 198 37 521

(51) Int. Cl.$^7$ .................................................. B60K 28/16

(52) U.S. Cl. .............................. 701/82; 701/83; 701/84; 180/197; 303/142

(58) Field of Search ................................ 701/82, 71, 74, 701/75, 78, 79, 83, 84, 85, 90; 180/197; 303/141, 139, 142

(56) References Cited

U.S. PATENT DOCUMENTS

| | | |
|---|---|---|
| 4,625,824 | 12/1986 | Leiber . |
| 5,573,315 * | 11/1996 | Schmitt et al. ................ 701/83 |
| 5,688,079 * | 11/1997 | Bach et al. ..................... 701/83 |
| 5,696,683 | 12/1997 | Schäfer et al. . |
| 5,732,379 * | 3/1998 | Eckert et al. ................... 701/83 |
| 5,754,967 * | 5/1998 | Inoue et al. .................... 701/84 |
| 5,864,769 * | 1/1999 | Inagaki et al. ................. 701/83 |
| 5,978,726 * | 11/1999 | Takeda et al. .................. 701/84 |

* cited by examiner

*Primary Examiner*—Richard M. Camby
(74) *Attorney, Agent, or Firm*—Kenyon & Kenyon

(57) ABSTRACT

In a method and an apparatus for drive slip control, a switchover is made in the initial vehicle movement (drive-off) range from slip control to reference engine speed control. Additionally or alternatively, a braking intervention is performed, the braking force being controlled (in closed loop) only at the wheel which first exhibits slip, and the braking force control being accomplished in such a way that the other wheel runs in substantially stable fashion.

12 Claims, 4 Drawing Sheets

METHOD AND APPARATUS FOR CONTROLLING DRIVE SLIP

BACKGROUND INFORMATION

Drive slip control systems are known from the existing art in many variations. For example, European Patent No. 0 1 63 941 (corresponding to U.S. Pat. No. 4,625,824) describes a drive slip control system in which, when incipient slippage of at least one driven wheel is detected, that wheel is braked and/or the drive unit of the vehicle is caused to reduce its torque. In the low wheel rotation speed rangee, i.e. in the initial vehicle movement range, only the wheel which first exhibits incipient slippage is braked, while the other driven wheel, even if incipient slippage is present, remains unaffected until a threshold value for the rotation speed of the drive unit has been exceeded.

Although the vehicle's initial movement behavior has been considerably improved by this procedure, it is still not satisfactory in certain applications. This is evident especially from the fact that, for example on a sloping road surface, the vehicle can slide laterally if the second, uncontrolled wheel becomes unstable.

It is an object of the present invention to improve a drive slip control system, especially in the initial vehicle movement range, in terms of the driving comfort and/or stability of the vehicle.

German Patent No. 43 44 634 (corresponding to U.S. Pat. No. 5,696,683) describes a drive slip controller in which the torque demand or torque reduction of the drive is ascertained from vehicle resistance torques. If an instability occurs, the drive torque of the vehicle's drive unit is reduced by the engine controller to that torque demand, in order to reestablish stability at the driven wheels.

SUMMARY OF THE INVENTION

The present invention considerably improves a drive slip control system, especially in the initial vehicle movement range, in terms of the driving comfort and/or stability of the vehicle.

In particular, the definition of a reference engine speed instead of the torque demand established in the event of instability results in more harmonious initial vehicle movement, since the reference speed can be optimally defined—as a function of various operating variables such as vehicle resistance, minimum engine speed, optimum slip, and gear ratio—in a manner specifically adapted for the initial vehicle movement operation.

It is particularly advantageous in this context that in vehicles with manual transmission, stalling of the drive unit is effectively prevented.

As a result of the advantageous procedure during braking intervention, according to which braking force is built up at the wheel which first exhibits impermissible slip and is regulated to the optimum slip of the other wheel, lateral sliding is effectively prevented even on a sloping road surface. The reason is that the other wheel essentially always runs in stable fashion.

It is advantageous in particular that alternating breakaway of the driven wheels, i.e. alternating instability of the driven wheels, is prevented, since the braking force at the one wheel is reduced in the event of instability at the other, while that other wheel is braked only to the point of preventing breakaway of that wheel.

It is particularly advantageous if the reference speed control system and the braking intervention coact.

DETAILED DESCRIPTION

Figure 1:
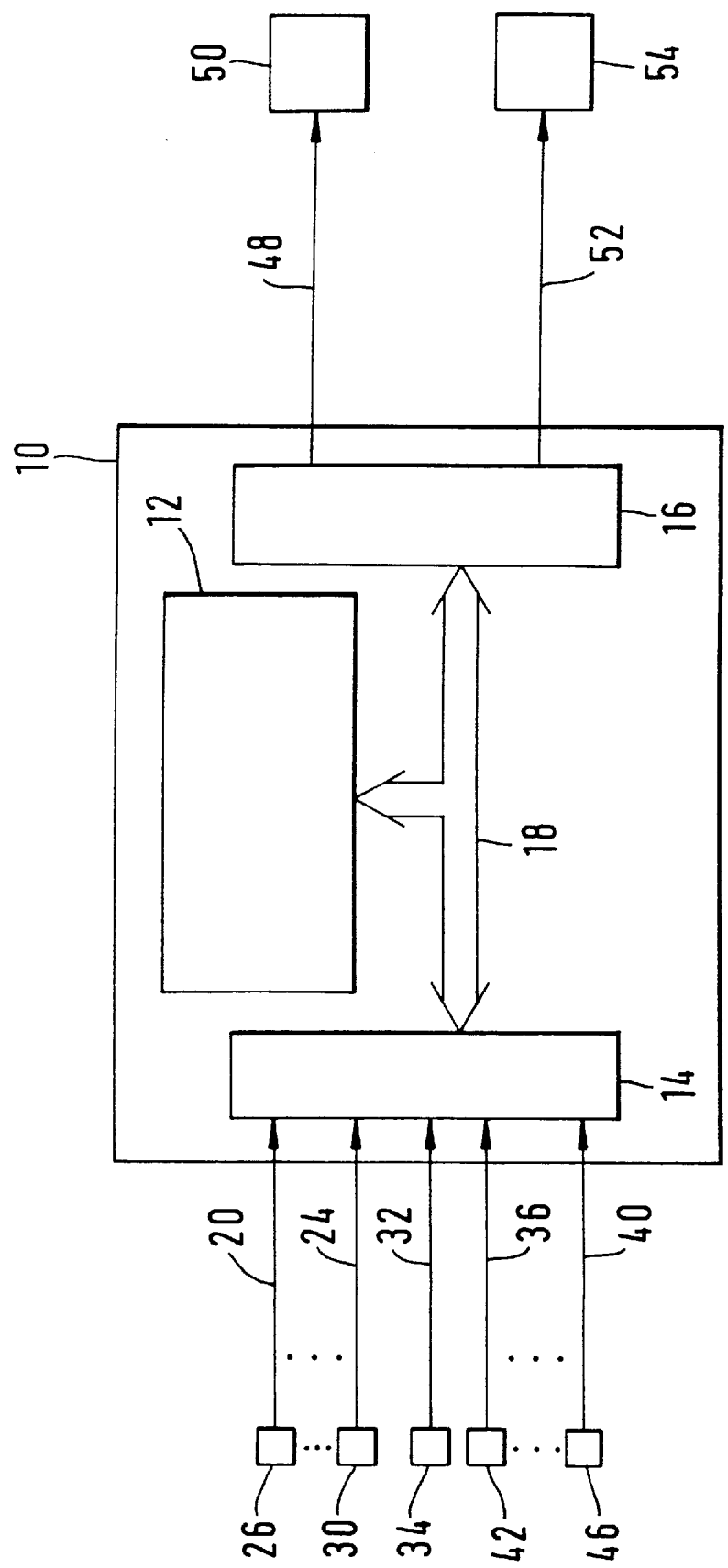
FIG. 1 shows a control unit for controlling drive slip.

FIG. 1 shows a control unit 10 which substantially includes a microcomputer 12, an input circuit 14, an output circuit 16, and a communication system 18 which connects the aforementioned components. Signals from measurement devices 26 through 30, representing the speeds of the vehicle wheels, are conveyed via input lines 20 through 24 to control unit 10 and input circuit 14 therein. In addition, an operating variable representing the instantaneous drive ratio in the drive train, for example the currently engaged gear, is transmitted via a line 32 from a corresponding measurement device 34 to input circuit 14. Also provided are input lines 36 through 40, which convey from measurement devices 42 through 46 further operating variables of the drive unit and/or the vehicle that are required in conjunction with the drive slip control system. Examples of such operating variables are, for example, the torque delivered by the drive unit (an internal combustion engine in this exemplary embodiment), the throttle valve opening, various temperature variables, the engine speed, etc. The measurement devices represent sensors which ascertain the variables in question or, in other embodiments, devices which determine the variables from one or more measurement signals. Control unit 10 influences drive unit 50 of the vehicle via output lines 48, while it controls braking system 54 of the vehicle via output lines 52.

Depending on the exemplary embodiment, drive unit 50 is an internal combustion engine, an electric motor, etc. This is immaterial in conjunction with what is proposed according to the present invention, since only the adjustment of torques or rotation speeds of the drive unit is at issue.

Braking system 54 can correspondingly, depending on the exemplary embodiment, be a hydraulic, pneumatic, or electric motor-driven braking system (wheel brakes with brake application by electric motor), or a combination of such braking systems. Reference will therefore be made hereinafter to the braking force at the wheels, which depending on the embodiment can mean the braking pressure, the braking force between road surface and tires, the braking force in the region of the wheel brake, a braking torque exerted there, an electrical current variable representing such a variable, etc.

In order to improve drive torque control, a switchover is made in the initial vehicle movement range, i.e. in the range of low wheel speeds or vehicle speeds and/or if a driver input for initial vehicle movement is present, from a slip control function (on the basis of which the torque demand is established) to a reference engine speed control function.

The reference engine speed is constituted as a function of the vehicle resistance FWM, a minimum engine speed Nmin, an optimum slip λopt, and the gear ratio Iges. The vehicle resistances are calculated as described in the existing art cited initially. The minimum engine speed Nmin is defined as a function of gear ratio (characteristic curve), and identifies the engine speed below which there exists a risk of stalling the drive unit. The optimum slip is also defined by way of a characteristic curve or table, for example as a function of vehicle speed. As a function of the vehicle resistances, the reference engine speed is plotted in an applied characteristics diagram, a characteristic curve, or a table. In all cases, the engine speed rises as the vehicle resistances increase. If the reference engine speed falls below the gear ratio-dependent minimum engine speed, it is set to that engine speed. The optimum slip is also taken into account, a desired correlation between reference engine speed and optimum slip being defined.

In the preferred exemplary embodiment, this approach is implemented as a computer program of computer 12. One example thereof is depicted as a flow chart in FIG. 2.

Figure 2:
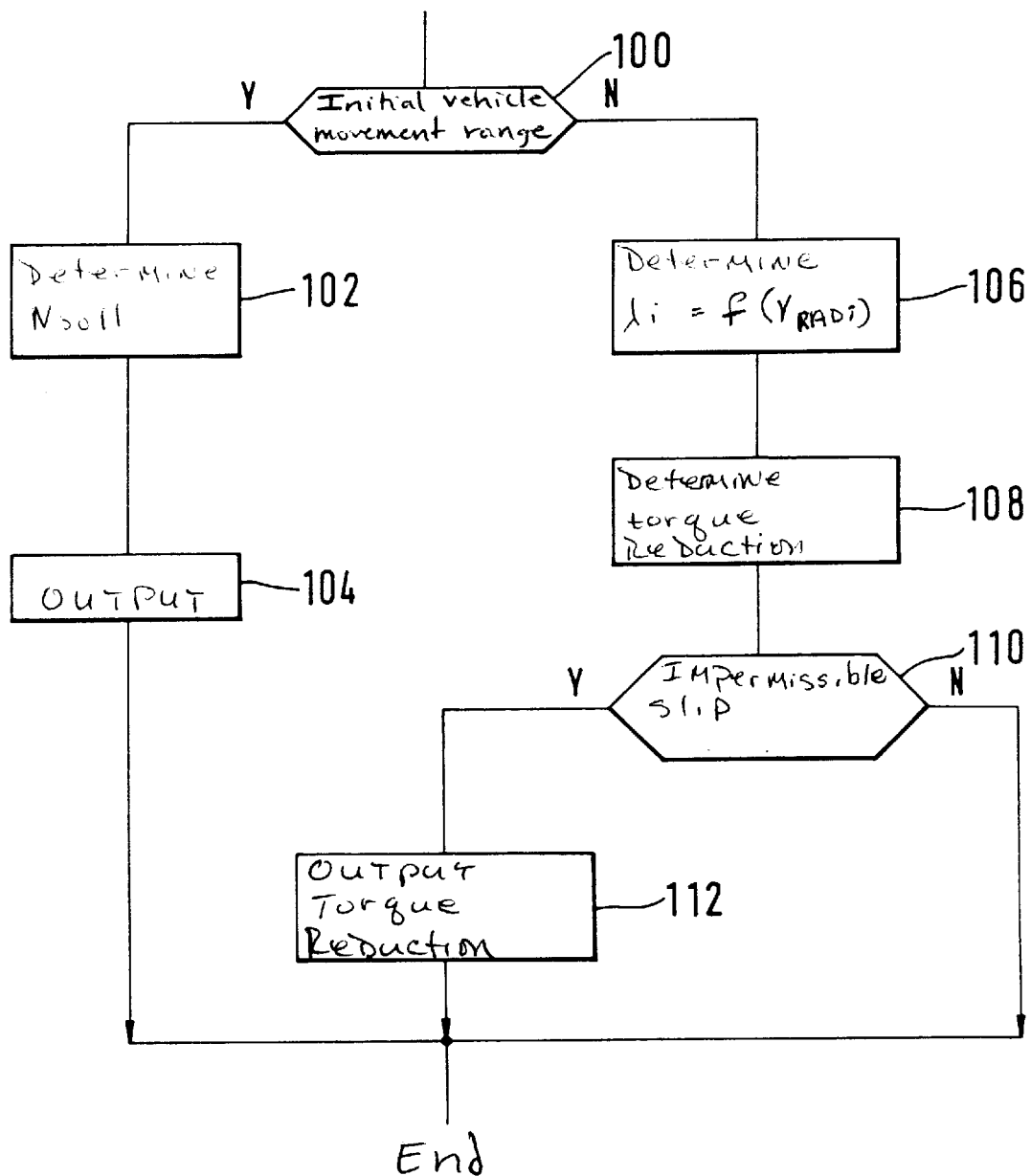
FIG. 2 depicts a preferred exemplary embodiment of an engine intervention in the form of a flow chart.

The program sketched in FIG. 2 is initiated at predefined time intervals. In the first step 100, a check is made, for example on the basis of at least one wheel speed variable, as to whether the system is in the initial vehicle movement range, i.e. whether the wheel speed falls above or below a predefined threshold. Additionally or alternatively, a signal representing the driver input, e.g. the accelerator pedal position, is utilized, the initial vehicle movement range being present if a driver output request (accelerator pedal actuation) is detected. If the vehicle is in the initial vehicle movement range, then in step 102 the reference engine speed Nsoll is determined as indicated above, and is output to the engine control unit in step 104. In another exemplary embodiment, the engine speed control function is calculated in the brake control unit and is output to the engine control unit as an activation signal or as a reference torque value. In this case the engine speed controller is implemented as a subordinate controller in the engine torque controller or the throttle valve controller of the ABS/ASR control device.

In a preferred exemplary embodiment, engine speed control takes place in the context of control unit 10, the difference between the acquired actual engine speed and the reference engine speed being determined and converted, for example via a proportional controller, into a torque change value for the drive unit. That value is then transmitted to the engine control unit. After step 104 the program is terminated.

If the vehicle is not in the initial vehicle movement range, a drive torque control action is performed in accordance with the existing art cited initially. This means that first, in step 106, the current slip value λi is determined for each driven wheel as a function of the wheel speed, with reference to at least one reference variable. Then, in step 108, the torque reduction or torque demand is ascertained in accordance with the formulas described in the existing art. In step 110, a check is then made as to whether an impermissible slip, i.e. a slip value which lies above the predefined optimum slip, is present at at least one driven wheel. If so, then in step 112 the torque reduction or torque demand for adjustment is delivered to the control unit of the drive unit, while otherwise the program terminates as it does after step 112, and is repeated at a defined time.

In the initial vehicle movement range, a switchover therefore occurs from slip control (steps 106 through 112) to engine speed control (steps 102 through 104).

In the case of a braking intervention, which depending on the exemplary embodiment can occur alternatively to or instead of the drive torque control action, the following procedure is used. The braking force at the wheel which first experiences slip (low wheel) is regulated to the optimum slip of the other wheel (high wheel). This is accomplished as follows: When the instability occurs, first of all braking force is built up at the low wheel until a first instability limit at the high wheel has been exceeded. If a second limit is exceeded at the high wheel, a reduction in braking force at the low wheel occurs, until the high wheel is once again in the stable range. No buildup of braking force occurs at the high wheel. In one exemplary embodiment, it is only as of a certain braking force at the low wheel that the high wheel is slightly preloaded, i.e. a small braking force is built up there in order to prevent breakaway (very high impermissible slip) of that wheel. With this procedure, a high wheel that is selected at the beginning of the braking intervention is always kept stable until the braking intervention has ended, for example because a change occurs in the conditions (e.g. the coefficient of friction) at the driven wheels.

Figure 3:
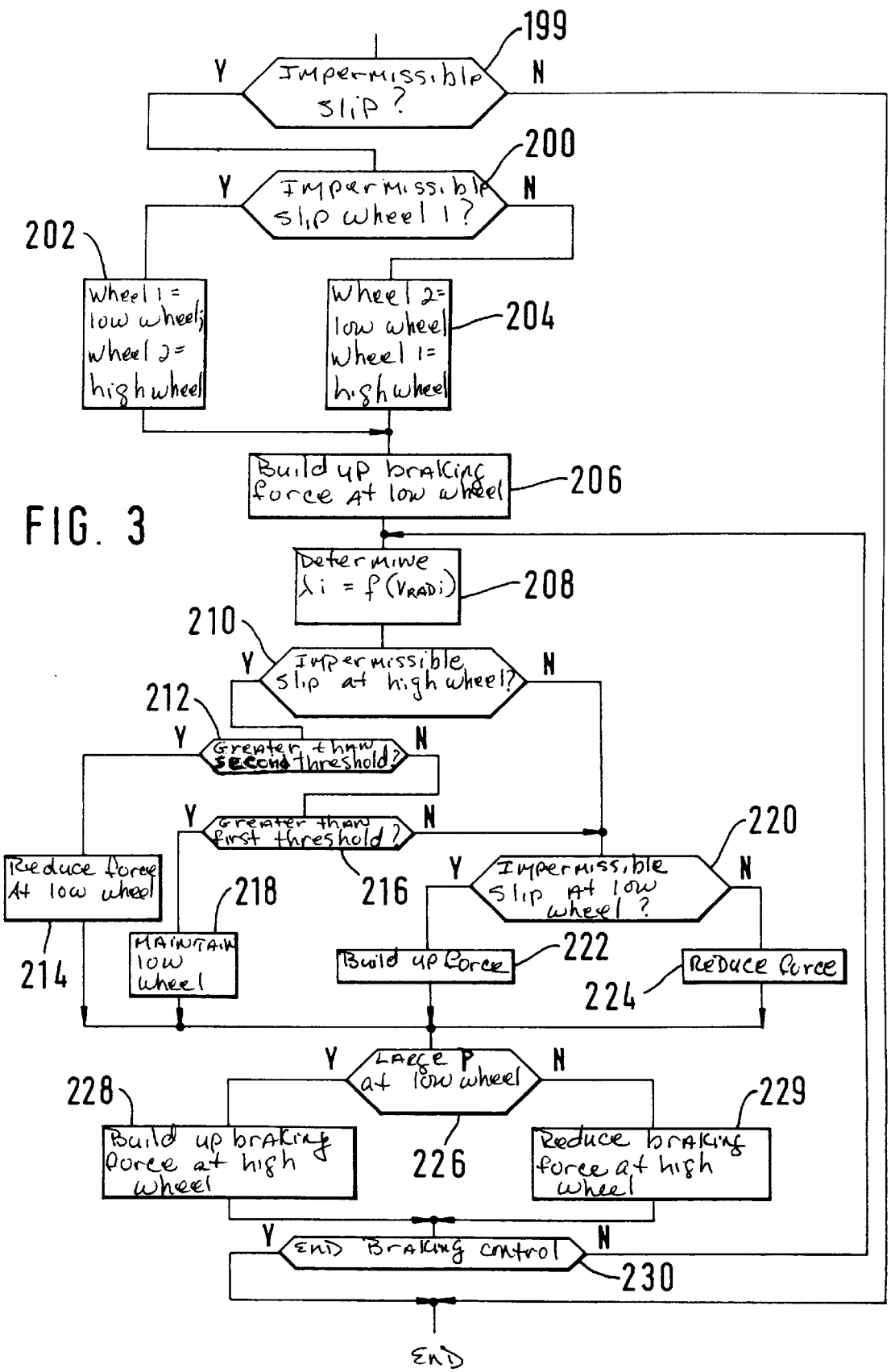
FIG. 3 shows a preferred exemplary embodiment of braking intervention in the form of a flow chart.

A preferred exemplary embodiment of the braking intervention is depicted in FIG. 3 with reference to a flow chart. The program described therein is once again executed at predefined times. In a preferred exemplary embodiment, the program is executed only in the initial vehicle movement range, but in other applications it can be used in the entire drive slip control system operating phase.

In the first step 199, a determination is made at least on the basis of the wheel speeds, e.g. in accordance with the methods depicted in FIG. 2, as to whether an impermissible slip has occurred at one of the driven wheels. If not, the program is terminated. Otherwise, in step 200 a check is made as to whether the impermissible slip has occurred at the first wheel. If so, then in step 102 wheel 1 is defined as the low wheel and wheel 2 as the high wheel. Otherwise, if the impermissible slip has occurred at the second wheel, in step 204 the second wheel is defined as the low wheel and the first wheel as the high wheel. In step 206, braking force is then built up at the low wheel. In step 208, the instantaneous slip λi is determined for each wheel as a function of its wheel speed VRadl. A check is then made in step 210 as to whether a slip value exceeding the optimum has occurred at the high wheel. If so, a query is made in step 212 as to whether the slip is greater than a second threshold. If so, in step 214 braking force is reduced at the low wheel. If the slip at the high wheel has not yet exceeded the second threshold, a check is then made in step 216 as to whether the slip has exceeded a first threshold which is lower than the second threshold. If so, in step 218 the braking force at the low wheel is maintained. If the slip at the high wheel is less than the first threshold or if no slip is occurring, then in step 220 a check is made as to whether impermissible slip exists at the low wheel. If so, braking force is built up in step 222, otherwise it is reduced in step 224.

After steps 214, 218, and 222 or 224, a check is made in query step 226 as to whether the braking force P built up at the low wheel is large, i.e. whether it has exceeded a predefined threshold value. If so, in step 228 a certain amount of braking force is built up at the high wheel in order to preload that wheel. If the braking force has fallen below a threshold value (which need not be identical to the threshold value for braking force buildup) braking force is reduced as applicable in step 229. Then in step 230, as is the case after step 228, a check is made as to whether braking control is complete. This condition exists if no further slip is occurring and if the braking force at the low wheel has been reduced to zero. If so, the program is terminated and is initiated again at the next point in time; otherwise the program is repeated with step 208.

Depending on the exemplary embodiment, either only the drive torque controller, or the braking controller, or both procedures, are used. The latter situation is depicted in the time diagrams of FIGS. 4a–4e, using the example of a typical driving situation.

Figure 4A:
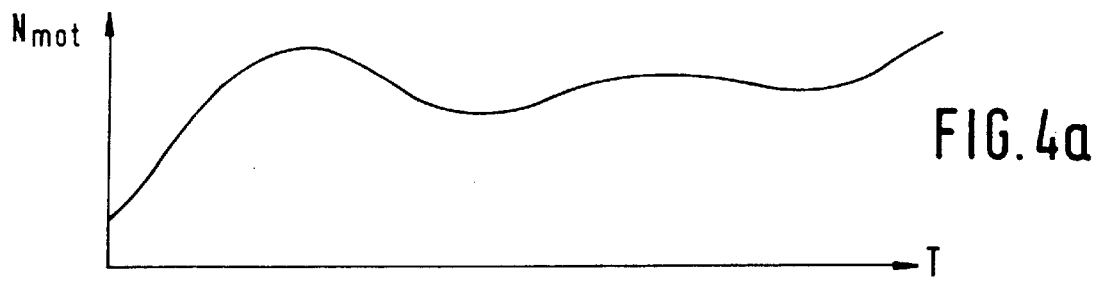
FIG. 4a depicts a first timing diagram which illustrates the effect of the two approaches.
Figure 4B:
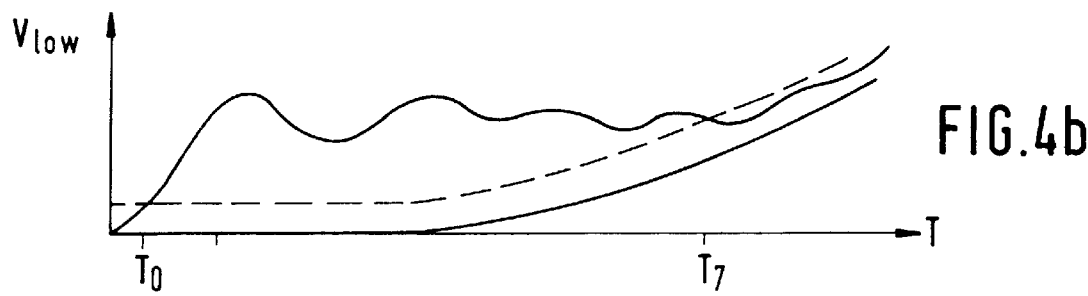
FIG. 4b depicts a second timing diagram which illustrates the effect of the two approaches.
Figure 4C:
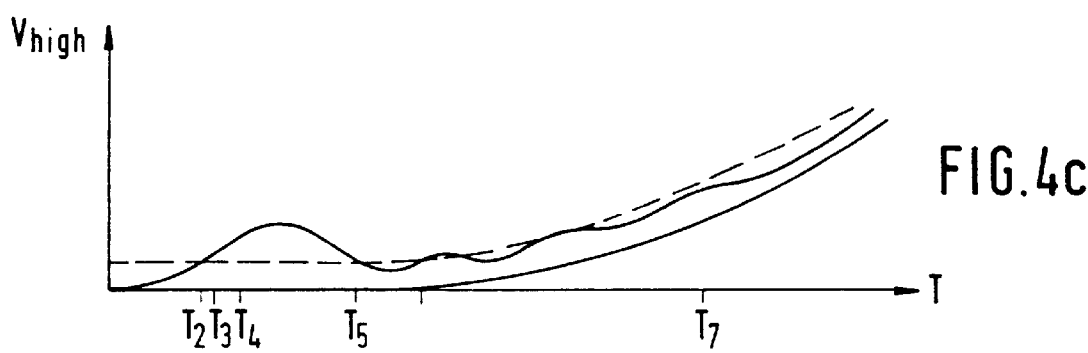
FIG. 4c depicts a third timing diagram which illustrates the effect of the two approaches.
Figure 4D:
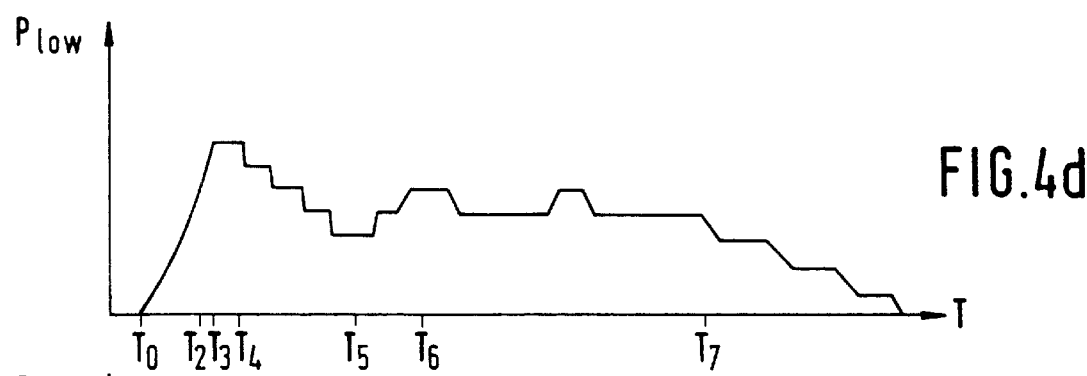
FIG. 4d depicts a fourth timing diagram which illustrates the effect of the two approaches.
Figure 4E:
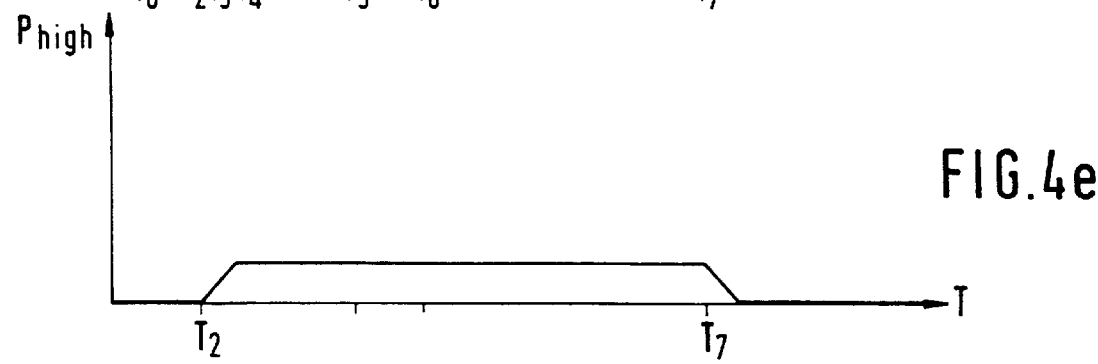
FIG. 4e depicts a fifth timing diagram which illustrates the effect of the two approaches.

In FIG. 4a the engine speed Nmot is plotted against time T, while FIG. 4b shows the speed Vlow of the low wheel, FIG. 4c that of the high wheel (Vhigh), FIG. 4d the braking force (Plow) at the low wheel, and FIG. 4e the braking force (Phigh) at the high wheel.

FIGS. 4a–4e depict an initial vehicle movement operation in which one wheel exhibits incipient slippage. At time T0, the speed of the low wheel as shown in FIG. 4b exceeds the optimum slip (depicted with dashed lines). This means that at time T0, the braking force at the low wheel is increasing in accordance with the difference between the speed of the low wheel and the optimum slip (FIG. 4d). The controlled engine speed exhibits a rising profile (FIG. 4a). At a time T2, the speed of the high wheel (FIG. 4c) also exceeds the optimum slip.

This causes the braking force on the low wheel to be maintained (FIG. 4b).

Since the braking force at the low wheel has already exceeded a threshold value at time T2, at that time braking force is built up at the high wheel (FIG. 4e) in order to preload it. At time T4, the slip at the high wheel is so great (FIG. 4c) that a reduction in braking force occurs at the low wheel (FIG. 4d). At time T5, the speed of the high wheel falls below the optimum slip (FIG. 4c), so that at time T5 the braking force reduction is halted (FIG. 4d). Because the impermissible slip continues to exist at the low wheel, the braking force is then built up again (FIG. 4d) until at time T6 the high wheel once again exceeds the optimum slip (FIG. 4c). The braking force at the low wheel is maintained (FIG. 4d). This sequence repeats until time T7, at which both the low wheel and the high wheel are no longer unstable (FIGS. 4b and 4c). Consequently, at time T7 the braking force at the high and low wheels is reduced to zero (FIGS. 4d and 4e). The vehicle then leaves the initial movement range. FIG. 4a correspondingly shows an engine speed profile which is defined in accordance with the presentation above.

In conclusion, it is evident that the driven wheel at which slip first occurred is regulated, by building up, reducing, or maintaining braking force, in such a way that the other driven wheel runs at the optimum slip.

What is claimed is:

1. A method for controlling a drive slip of a vehicle, comprising the steps of:

reducing at least a torque of a drive unit of the vehicle upon an occurrence of an incipient slippage of at least one driven wheel of the vehicle; and performing, in an initial movement range of the vehicle, an engine speed control action, a reference engine speed value of which being defined as a function of operating variables of the vehicle and of the drive unit, the reference engine speed value being adjusted at the drive unit.

2. The method according to claim 1, wherein the reference engine speed value depends on a vehicle resistance, a minimum engine speed, an optimum slip and a gear ratio.

3. The method according to claim 1, further comprising the step of performing a slip control function outside the initial movement range.

4. The method according to claim 1, wherein the engine speed control action is performed in a torque controller of an ABS/ASR control unit.

5. A method for controlling a drive slip of a vehicle, comprising the steps of:

detecting an incipient slippage at at least one of a first driven wheel and a second driven wheel of the vehicle;

identifying at which one of the first driven wheel and the second driven wheel the slippage was first detected;

upon detecting the slippage, performing an intervention, to reduce the slippage, at a wheel of the first driven wheel and the second driven wheel at which the slippage was first detected; and controlling a braking force at the wheel of the first driven wheel and the second driven wheel at which the slippage was first detected such that other wheel of the first driven wheel and the second driven wheel of the vehicle runs in a substantially stable fashion.

6. The method according to claim 5, further comprising the step of braking the wheel of the first driven wheel and the second driven wheel at which the slippage was first detected such that the other wheel of the first driven wheel and the second driven wheel runs at an optimum slip.

7. The method according to claim 6, further comprising the step of reducing the braking force built up at the wheel of the first driven wheel and the second driven wheel at which the slippage was first detected in response to an instability at the other wheel of the first driven wheel and the second driven wheel.

8. The method according to claim 7, wherein the braking force is reduced until the other wheel of the first driven wheel and the second driven wheel is once again in a stable range.

9. The method according to claim 6, further comprising the step of performing a braking force buildup at the other wheel of the first driven wheel and the second driven wheel in order to carry out a preload operation, upon an occurrence of a predetermined braking force at the wheel of the first driven wheel and the second driven wheel at which the slippage was first detected.

10. The method according to claim 5, further comprising the step of halting a braking force buildup at the wheel of the first driven wheel and the second driven wheel at which the slippage was first detected if a first slip limit at the wheel of the first driven wheel and the second driven wheel at which the slippage was first detected is exceeded.

11. An apparatus for controlling a drive slip of a vehicle, comprising:

a control unit for detecting an incipient slippage of at least one driven wheel of the vehicle, for reducing at least a torque of a drive unit of the vehicle when the slippage has been detected, and, in an initial movement range of the vehicle, for ascertaining a reference engine speed value as a function of operating variables of at least one of the vehicle and the drive unit, the reference engine speed value being adjusted at the drive unit.

12. An apparatus for controlling a drive slip of a vehicle, comprising:

a control unit for detecting an incipient slippage of at least one of a first driven wheel and a second driven wheel of the vehicle, for building up, in response to the detection of the incipient slippage and in order to reduce the incipient slippage, a braking force only at a wheel of the first driven wheel and the second driven wheel at which the incipient slippage first occurred, and for controlling the braking force at the wheel of the first driven wheel and the second driven wheel at which the slippage first occurred such that other wheel of the first driven wheel and the second driven wheel of the vehicle runs in a substantially stable fashion.

* * * * *